T. S. HAMILTON.
METHOD OR PROCESS OF PURIFYING HYDROCARBON LIQUIDS.
APPLICATION FILED APR. 22, 1911.
1,018,971.
Patented Feb. 27, 1912.
3 SHEETS—SHEET 3.
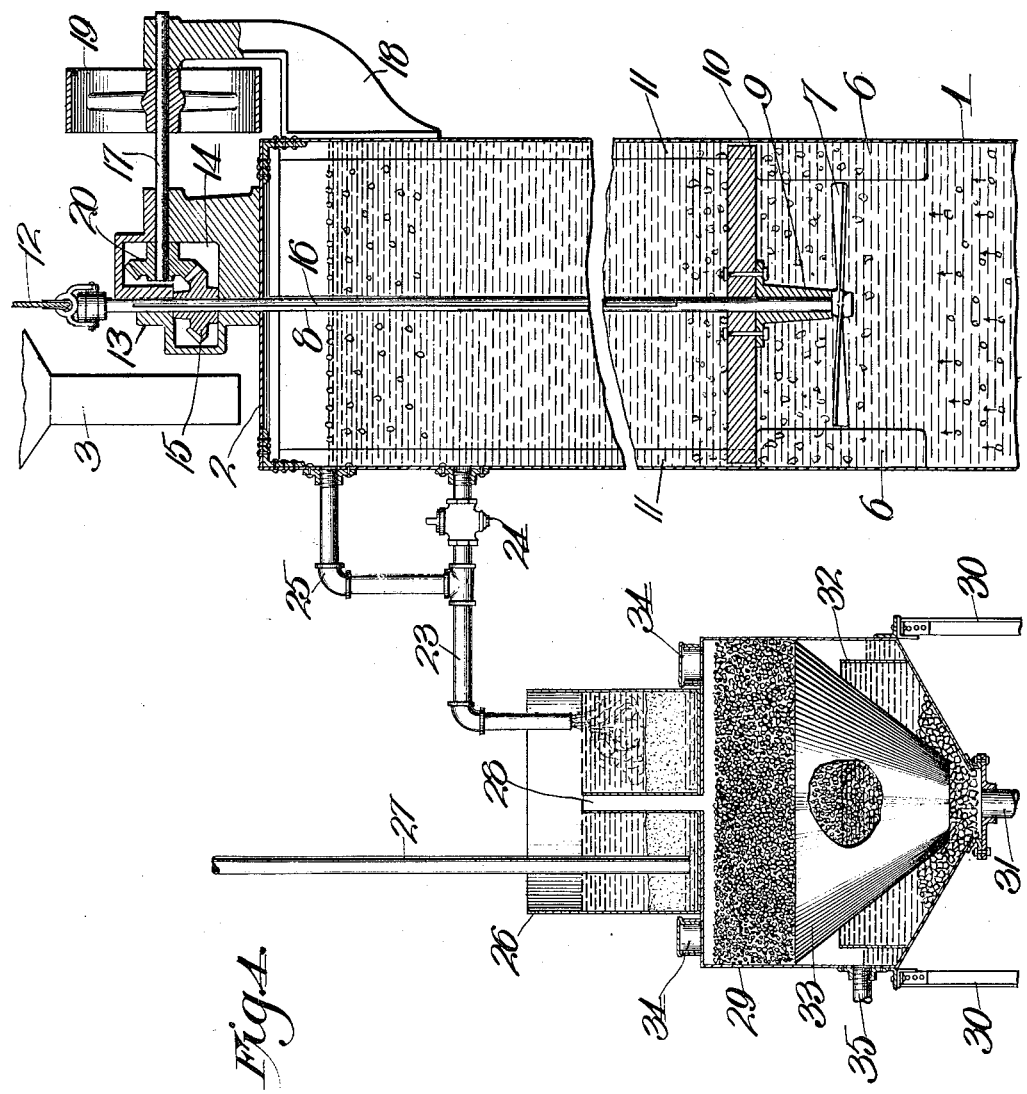

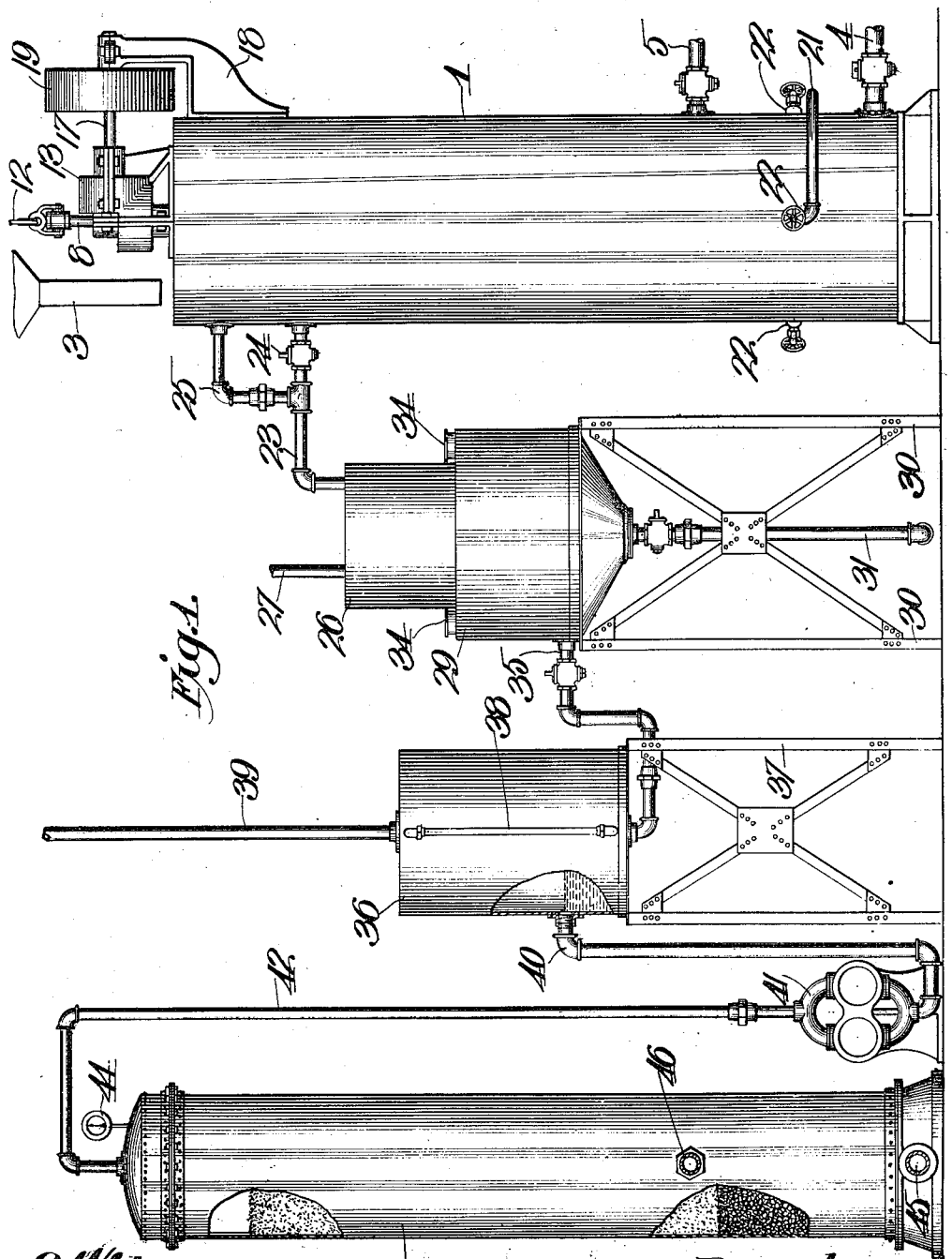

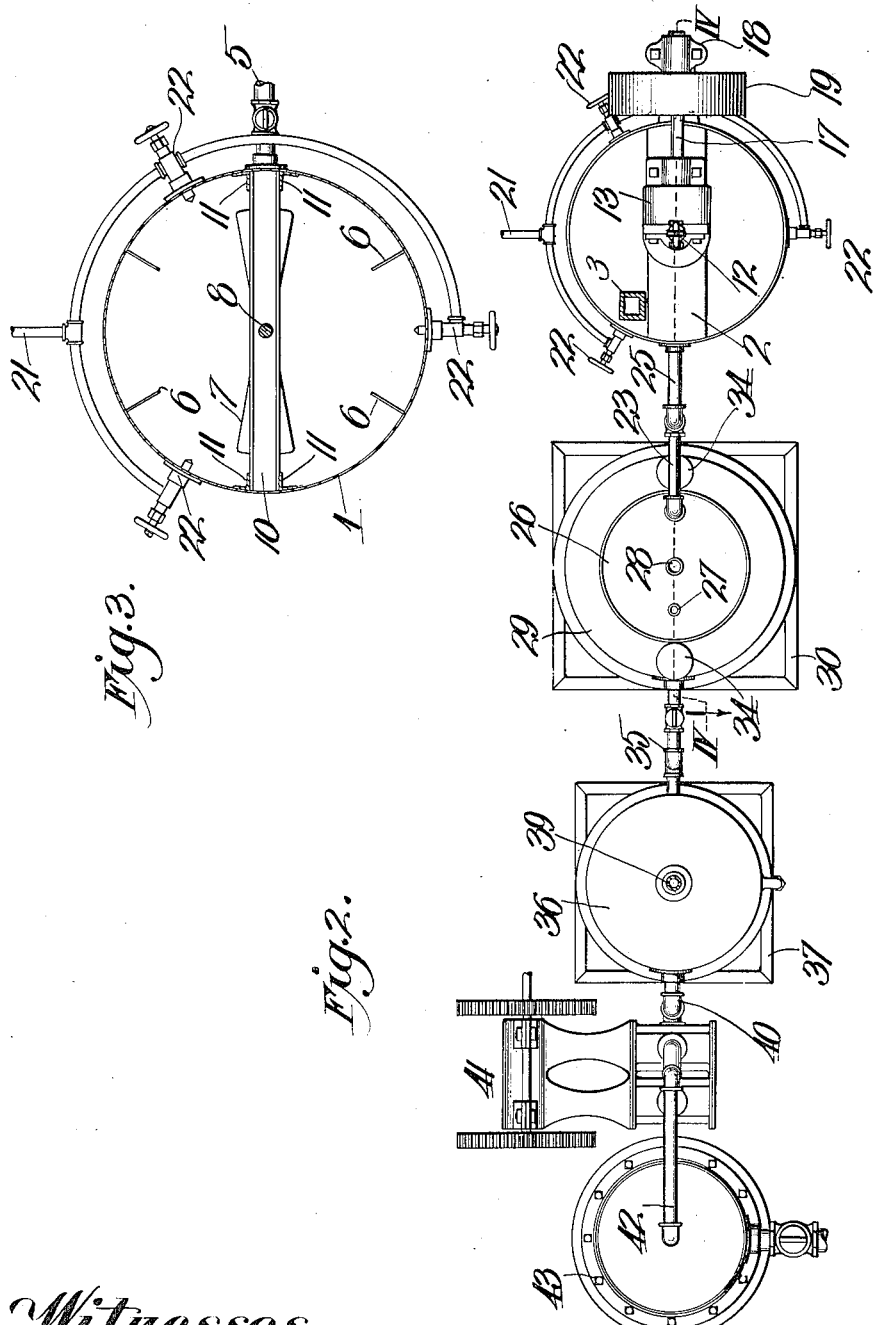

UNITED STATES PATENT OFFICE.

THOMAS S. HAMILTON, OF KANSAS CITY, MISSOURI, ASSIGNOR TO THE PURIFIED PETROLEUM PRODUCTS COMPANY, A CORPORATION OF SOUTH DAKOTA.

METHOD OR PROCESS OF PURIFYING HYDROCARBON LIQUIDS.

1,018,971.     Specification of Letters Patent.     Patented Feb. 27, 1912.

Application filed April 22, 1911. Serial No. 622,802.

*To all whom it may concern:*

Be it known that I, THOMAS S. HAMILTON, a citizen of the United States, residing at Kansas City, in the county of Jackson and State of Missouri, have invented certain new and useful Improvements in Methods or Processes of Purifying Hydrocarbon Liquids, of which the following is a specification.

This invention relates to a method or process of purifying naphtha, coal oil, and other hydrocarbon liquids without distillation, and has for its object to accomplish such purpose efficiently, rapidly and economically.

To this end the invention consists broadly, in discharging the liquid to be purified in a finely divided state and under heavy pressure, preferably, into a solution possessing the property, under agitation, of combining with the liquid to form an emulsion which will rise to the top of the solution, in separating the emulsion from the solution, and in subjecting the emulsion to shock or vibration to effect the separation of the pure oils from the impure oils or residue.

It further contemplates the filtration of the pure oil of the emulsion after the separation of such oil from the residue is effected.

It also contemplates mixing the purified oil with air under heavy pressure for the purpose of making the oil highly volatile, and the employment of a cleansing agent to remove any foreign matter which may remain in the oil and reduce its marketable value for any purpose.

In order that the invention may be fully understood, reference is to be had to the accompanying drawings illustrative of the preferred apparatus for performing the process, the novelty of the process being embraced in the appended claims.

Figure 1, is a side elevation of apparatus whereby the method or process of purifying hydrocarbon liquids may be efficiently performed, certain elements of the apparatus being broken away. Fig. 2 is a top plan view of the apparatus. Fig. 3, is a horizontal section of the chief or indispensable element of the apparatus, on the line III—III of Fig. 1. Fig. 4, is an enlarged vertical section, on the line IV—IV of Fig. 2.

Before proceeding with the detailed description of the process and apparatus for performing the same, it is desired to state that heretofore oil has been mixed with a solution of salt and other chemicals for the purpose of rendering hydrocarbon oils, such as coal oil and gasolene, non-combustible and to purify it so that it shall be susceptible of use in lamps without smoking the globes thereof. I therefore disclaim the broad idea of mixing hydrocarbon oils with a saline or other solution of such character that the heavy or waxy constituents and other impurities shall be precipitated. I am not aware however, of any process or apparatus which contemplates the production of an emulsion which can be produced by using more salt or its equivalent than the water is capable of dissolving. Nor am I aware of any process or apparatus which contemplates subjecting an emulsion composed of a saline solution and hydrocarbon liquid, to shock or vibration for the purpose of separating the lighter or pure oil of the emulsion from the residuum thereof.

In the said drawings, 1 is a tank having an open upper end through which it is adapted to receive a quantity of water and salt, the latter being introduced from a chute 3. The salt supplied is preferably in lump or granulated form and in such quantity that there will always be a considerable quantity of the salt in lump form in the tank. The tank is bridged at its upper end by a cross bar 2, and communicating with the tank at different heights is a valve-controlled drain pipe 4, and a draw-off pipe 5. Internally the tank is provided with a series of baffle plates 6, to coöperate with the rotary agitator 7, in effecting the thorough mixture of the contents, hereinafter specified, of the tank. The agitator is secured upon the lower end of a vertical shaft 8, journaled at such end in a bearing 9 depending from a cross-bar 10, fitting slidingly at its ends between vertical guides 11, secured to the wall of the tank. Should it be desired to suspend the agitation for a time, the agitator should be lifted up by the cable out of the crystalline mass, as otherwise the great mass of surrounding crystals would render the resumption of the agitation difficult. The upper end of the shaft is journaled and capable of sliding in a bearing bracket 13, secured to cross bar 2, and said bracket is provided with an opening 14, receiving a bevel gear 15 splined upon the shaft so as to turn with and slide upon the same, the shaft being longitudinally grooved at 16, for this purpose.

17 is a shaft journaled in bracket 13, and a bracket 18 secured to the tank. Secured on said shaft is a belt wheel 19 or its equivalent, adapted to be turned from a counter shaft, not shown, or other driving means, and secured on the inner end of said shaft 17 is a bevel gear 20, meshing with bevel gear 15 for the purpose of revolving the latter and hence the shaft and agitator.

21 is a supply pipe for the hydrocarbon liquid to be purified, and said pipe is provided with one or more valved nozzles 22, for discharging such liquid under pressure into the tank, the nozzles being preferably of a character which will discharge the liquid in the form of a fine spray.

23 is a discharge pipe leading from the tank at a suitable height and provided with a controlling valve 24, and 25 is a pipe connecting pipe 23 outward of the valve 24, with the tank at a higher plane than said pipe 23.

26 is a vessel to receive the discharge from pipe 23, and extending into said vessel is a suction or equivalent pipe 27, by which the heavy residue or grease may be withdrawn from the vessel. The latter is provided with an overflow pipe 28 through which the lighter product or oil purified by the treatment which it undergoes in tank 1, escapes, and underlying and communicating with said pipe and preferably supporting the vessel is a filter 29, mounted upon a suitable supporting frame 30. The bottom of the filter is of hopper form and is provided at its lowest point with a drain pipe 31, for the withdrawal of any water which may pass through the filter and arranged upon the bottom and spaced inward from the side wall of the filter is a wall 32, to confine any water at the bottom of the filter, until drained off through pipe 31. Depending through the space inclosed by the wall 32, and forming a liquid-tight connection at its upper edge with the wall of the tank, at a point above the wall 32, is a hopper 33 containing filtration material, as shown in Fig. 2, a portion of such material underlying the lower end of the hopper and being preferably coarser than that in the upper part of the hopper and above the same.

The filter is provided with a valve-controlled discharge pipe 35, communicating with the space surrounding the wall 32, below the top of the same, and the opposite end of said pipe is adapted to discharge into a vessel 36 through the bottom thereof, said tank being mounted upon a suitable support or stand 37, and provided with a gage 38 to indicate the quantity of liquid standing in the vessel. 39 is a pipe arranged to supply dry air to said vessel and 40 is a discharge pipe for the liquid and air, connected at its opposite end to a suitable pump 41, the discharge end of said pump being connected by a pipe 42 to the upper end of a tank 43, containing a cleaning agent of any suitable character. The tank is preferably provided with a pressure gage 44, and with valve-controlled discharge pipes 45 and 46, the latter being employed mainly for cleaning out purposes.

The best solution for performing the purification operation, of which I have present knowledge, is a salt solution or brine produced by supplying tank 1 with the requisite quantity of salt and water, and I have also found that the best effects are produced by employing a considerable quantity of rock salt in small lumps, there being such a proportion of salt that the water cannot dissolve all of it.

I do not restrict myself by the term salt to the substance sodium chlorid, nor by the term saline solution to a solution of sodium chlorid, as I have used solutions other than sodium chlorid with advantageous effect.

In practice, after the tank has been charged with a saline solution to about the level of the lowest portion of the opening in the horizontal portion of the pipe 23, the agitator is caused to operate and effect a violent agitation of the solution and while in such violent agitation naphtha or other hydrocarbon liquid is sprayed into the tank, and is as hereinbefore stated, preferably in a finely divided state and under a pressure of preferably one hundred and fifty pounds or more, although results have been produced at a somewhat lower presure, so that practically every atom of the naphtha or liquid comes in contact with the solution and an emulsion is produced. The paraffin or waxy constituents of the oil having an affinity for the salt, accumulates on the lumps thereof and either flakes off or becomes part of the emulsion and rises to the top of the solution. As long as the operation is in progress, and it continues indefinitely, this accumulation of the waxy constituents of the oil on the salt and the flaking or separating of the same from the salt continues, the lumps of salt gradually diminishing in size and from time to time additional salt, some of it in crystal form, is added to compensate especially for that lost in the crystalline form in the operation, it being also understood that the loss of water incident to the passage of the emulsion from the tank, as hereinafter more specifically referred to, must be replaced in order that the quantity of saline solution shall remain substantially the same as long as the operation is in progress. In Fig. 4, the solution is designated by broken lines; the naphtha or other hydrocarbon liquid by circles with arrow points, and the emulsion by alternating dashes and circles.

During the treatment described, an emulsion consisting of light and heavy oil, water, salt and impurities is gradually produced and rises slowly to the top until eventually it attains the level of pipe 25 and flows through the same in a continuous stream, and in dropping through said pipe from the upper part thereof down into pipe 23, is subjected to a shock, jar or vibration which effectually separates the emulsion into light or pure oil and impure oil or residuum as is evidenced by the fact that this impure oil or residuum will now sink to the bottom of the receptacle 26, while the pure oil above flows out through pipe 28. Water and residuum may be drawn off from time to time by the pipe 27. Of course the drawing is merely diagrammatic and it must be clearly understood that in practice the vertical portion of the pipe 25 would be longer than here indicated, being, in fact, not less than about five feet, and of such large dimensions in comparison to the volume of the emulsion flowing from the tank 1 that the emulsion, entering with considerable velocity and falling in the comparatively empty pipe, is broken up into its constituents. From tank 26 the purified oil may be withdrawn by any appropriate means, but I prefer that it shall be allowed to overflow through the pipe 28 onto filtering material in tank 29, Fig. 4, through which it passes to flow over the baffle plate 32 and be conducted away through pipe 35 to any suitable receptacle.

To give a lighter and more volatile character to the purified product, it may be conducted by pipe 35 into a vessel 36 with which communicates a pipe 39 leading to a dry air supply, either the upper portion of a room or building or to any other point where dry air may be obtained. The liquid is then pumped, under heavy pressure, carrying air along with it through a tank 43 containing a cleansing agent, by way of pipe 42, this agent being preferably casing salt, and acting as a coagulator to retain any mineral particles which stand in suspension in the oil and pass with the same through the filter, the casing salt also sustaining the pressure to permit of the continuous discharge of the oxygenized liquid into a storage tank, not shown, or its equivalent. The term casing salt is applied to a very finely divided salt which collects around the joints in the pipes in salt works and is especially suitable for this purpose. When this is used in the very considerable depth which it would be advisable to use, say, of not less than ten feet, in the tank 43, a considerable pressure, as above indicated, would be needed to force the oil with such rapidity for practical purposes through that casing salt or through similar suitable material. In the drawing, Fig. 1, the coarser granulations shown toward the bottom of tank 43 indicate the presence of coarse sand, or the like, which is commonly used in connection with finely divided filtering material, in order that such material will not pass from the filter tank 43. After running about three hundred and fifty gallons of hydrocarbon liquid through the tank, about one fourth of a pound of salt is introduced into the solution for each additional gallon of hydrocarbon liquid discharged into the tank, sufficient water being supplied to maintain the solution at about the level hereinbefore indicated, as a small proportion of the water is of course lost during the purification process. When the water becomes foul as it does at infrequent intervals, the purification process is stopped to permit the water line, which of course rises above pipe 23 while the treatment of the oil is in progress, to settle below pipe 23. The emulsion which stands on the water, and in appearance resembles thin gravy, is then drawn off through pipe 23 by opening valve 24. The salt water or the lower portion thereof, which is the foulest, may then be drawn off through pipe 5 and when the purification process is resumed, the water withdrawn is replaced by fresh water and the proper supply of salt introduced to compensate for that lost by the withdrawal of the water.

While the operation is in progress, the tank always contains water and oil in about the proportion of ten to one, and in a plant which I have in operation, which has a capacity of about three hundred and fifty gallons of water, the tank containing the same and three hundred and fifty pounds of salt also contains at all times about thirty-five gallons of oil, about thirty four gallons of which stand at the top of the solution in the form of an emulsion and one gallon in the body of the solution, this one gallon being turned into an emulsion as rapidly as the emulsion at the top flows off through pipe 25, as will be readily understood.

From the above description it will be apparent that I have evolved a process for purifying hydrocarbon oils and the apparatus for performing the same, and I wish it to be understood that while I have illustrated and described the preferred embodiment of the same I do not desire to be restricted to the exact details shown and described as obvious modifications will suggest themselves to one skilled in the art.

I do not claim in this application, the apparatus shown herein, since that is the subject of my co-pending application, Serial No. 626587, filed May 10, 1911.

I claim:

1. The method of purifying hydrocarbon liquids, consisting in introducing a hydrocarbon liquid into a tank containing a solution which will combine with such liquid to form an emulsion, in agitating the mixture to produce such emulsion, in effecting the removal of the emulsion from the tank and the solution therein, and in treating the removed emulsion to separate the impurities from the pure oil therein.

2. The method of purifying hydrocarbon liquids, consisting in introducing a hydrocarbon liquid into a tank containing a solution which will combine with such liquid to form an emulsion, in agitating the mixture to produce such emulsion, in effecting the removal of the emulsion from the tank and the solution therein, and in subjecting the removed emulsion to shock to separate the impurities from the pure oil therein.

3. The method of purifying hydrocarbon liquids, consisting in discharging a stream of hydrocarbon liquid in a finely divided state under pressure into a tank containing a solution which will combine with such liquid to form an emulsion, in agitating the mixture to produce such emulsion, in conducting such emulsion in a continuous stream from the tank and the solution therein, and in subjecting the emulsion after it passes from the tank, to shock or jar to "break" it to separate the heavy or impure oil or residue from the light or pure oil.

4. The method of purifying hydrocarbon liquids, consisting in discharging a stream of hydrocarbon liquid in a finely divided state under pressure into a tank containing a solution which will combine with such liquid to form an emulsion, in agitating the mixture to produce an emulsion, in conducting such emulsion in a continuous stream from the tank and the solution therein, in subjecting the emulsion after it passes from the tank, to shock or jar to "break" it to separate the heavy or impure oil or residue from the light or pure oil, and in filtering the light or purified oil.

5. The method of purifying hydrocarbon liquids, consisting in discharging a stream of hydrocarbon liquid in a finely divided state under pressure into a tank containing a solution which will combine with such liquid to form an emulsion, in agitating the mixture to produce such emulsion, in conducting such emulsion in a continuous stream from the tank and the solution therein, in subjecting the emulsion after it passes from the tank, to shock or jar to "break" it to separate the heavy or impure oil or residue from the light or pure oil, and in mixing the said light or pure oil with air and forcing the mixture under pressure, through a tank containing casing salt.

6. The method of purifying hydrocarbon liquids consisting in depositing salt in water contained in a tank in such quantity that there will remain a considerable quantity of salt which the water is incapable of dissolving, in violently agitating the mixture in the tank, in discharging a hydrocarbon liquid into the mixture in the tank, so that the agitation shall result in the production of an emulsion resembling a gravy in appearance, in conducting the emulsion from the solution in the tank, and in subjecting such conducted emulsion to shock to separate the light or pure oil from the heavy or impure oil or residuum.

7. The method of purifying hydrocarbon liquids, consisting in discharging a hydrocarbon liquid in finely divided state into a tank containing a solution which will combine with such liquid to form an emulsion, in agitating the mixture to produce such emulsion, in effecting the removal of the emulsion from the tank and the solution therein, and in subjecting the removed emulsion to shock to separate the impurities from the pure oil therein.

8. The method of purifying hydrocarbon liquids consisting in depositing salt in water contained in a tank in such quantity that there will remain a considerable quantity of salt which the water is incapable of dissolving, in violently agitating the mixture in the tank, in discharging a hydrocarbon liquid in finely divided state into the mixture in the tank, so that the agitation shall result in the production of an emulsion resembling gravy in appearance, in conducting the emulsion from the solution in the tank, and in subjecting such conducted emulsion to shock or jar to separate the light or pure oil from the heavy or impure oil or residuum.

9. The method of purifying hydrocarbon liquids, consisting in introducing a hydrocarbon liquid into a tank containing a solution which will combine with such liquid to form an emulsion, in agitating the mixture to produce such emulsion, in effecting the removal of the emulsion from the tank and the solution therein, in subjecting the removed emulsion to shock to separate the impurities from the pure oil therein, and in filtering the said light or pure oil after the same is separated from the impurities of the emulsion.

10. The method of purifying hydrocarbon liquids, consisting in introducing a hydrocarbon liquid into a tank containing a solution which will combine with such liquid to form an emulsion, in agitating the mixture to produce such emulsion, in effecting the removal of the emulsion from the tank and the solution therein, in subjecting the removed emulsion to shock to separate the impurities from the pure oil therein, and in mixing the said pure oil with air and forcing the mixture under heavy pressure through a cleaning agent.

11. The method of purifying hydrocarbon liquids, consisting in introducing a hydrocarbon liquid into a tank containing a solution which will combine with such liquid to form an emulsion, in agitating the mixture to produce such emulsion, in effecting the removal of the emulsion from the tank and the solution therein, in subjecting the removed emulsion to shock to separate the impurities from the pure oil therein, in filtering the said light or pure oil after the same is separated from the impurities of the emulsion, and in mixing said lighter or pure oil with air and forcing the mixture under heavy pressure, through a cleaning agent.

In testimony whereof I affix my signature, in the presence of two witnesses.

THOMAS S. HAMILTON.

Witnesses:
  HELEN C. RODGERS,
  G. Y. THORPE.